Figure 1:
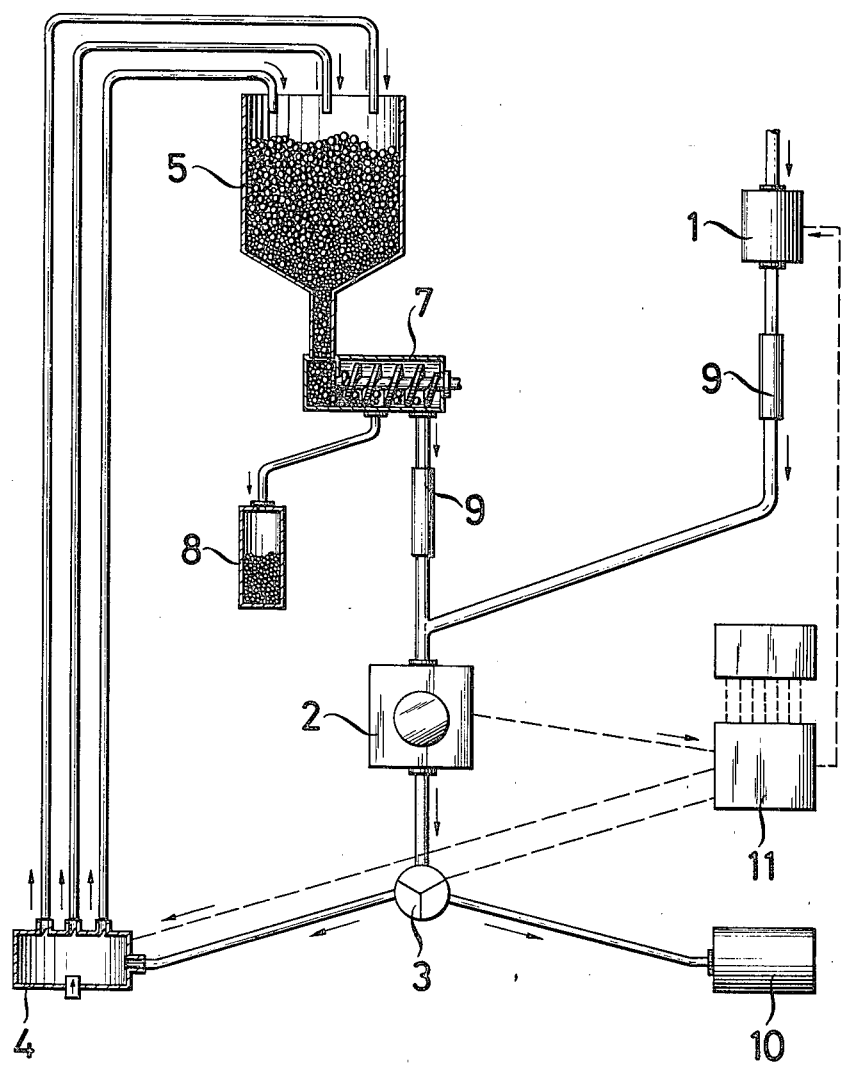

United States Patent [19]

von der Decken et al.

[11] 4,372,912
[45] Feb. 8, 1983

[54] METHOD OF CONTROLLING THE REACTIVITY OF A GAS-COOLED CORE REACTOR

[75] Inventors: Claus-Benedict von der Decken, Kohnscheid; Hans-Jürgen Hantke, Ketsch; Walter Stürmer, Mannheim, all of Fed. Rep. of Germany

[73] Assignee: Kernforschungsanlage Jülich Gesellschaft mit beschränkter Haftung, Jülich, Fed. Rep. of Germany

[21] Appl. No.: 167,432

[22] Filed: Jul. 8, 1980

Related U.S. Application Data

[63] Continuation of Ser. No. 934,373, Aug. 16, 1978, abandoned, which is a continuation-in-part of Ser. No. 732,455, Oct. 14, 1976, abandoned, which is a continuation of Ser. No. 471,967, May 21, 1974, abandoned.

[51] Int. Cl.³ .............................................. G21C 1/22
[52] U.S. Cl. ................................... 376/381; 376/333; 376/226
[58] Field of Search ............... 376/262, 265, 381, 382, 376/338, 354, 355, 172, 173, 333, 226

[56] References Cited

U.S. PATENT DOCUMENTS

| | | | |
|---|---|---|---|
| 3,142,625 | 7/1964 | Wellborn | 376/381 |
| 3,262,859 | 7/1966 | Winsche | 376/381 |
| 3,398,051 | 8/1968 | Seltorp | 376/338 |
| 3,464,888 | 9/1969 | Boettcher | 376/262 |
| 3,620,916 | 11/1971 | Hillborn et al. | 376/265 |

OTHER PUBLICATIONS

HKG 300 MWe Nuclear Power Plant Uentrop . . . ., Brown, Bovervil CIEAG (1/72) pp. 1-28.

*Primary Examiner*—Sal Cangialosi
*Attorney, Agent, or Firm*—Becker & Becker, Inc.

[57] ABSTRACT

A method of controlling the reactivity of a gas-cooled core reactor the core of which consists of a pile of poured balls of equal diameter of fuel material which are withdrawn from the pile in downward direction and, if desired, are again added from above in conformity with the extent to which the pile of fuel balls has burned off. The method is characterized primarily in that balls which consist of absorbing material and have a diameter shorter than the diameter D of the balls of fuel material are introduced into the poured pile, the diameter $d_A$ of the balls of absorbing material being $d_Z \leq d_A \leq d_Z + xd$, preferably $d_Z < d_A < d_Z < +xd_Z$ if $d_Z = D(2\sqrt{3} - 1)$ and representing the diameter of the maximum possible ball which can be placed in the densest ball packing between three interengaging balls of fuel material, and when $d_Z + xd_Z = D(\sqrt{2} - 1)$.

1 Claim, 20 Drawing Figures

METHOD OF CONTROLLING THE REACTIVITY OF A GAS-COOLED CORE REACTOR

This is a straight continuation application of Ser. No. 934,373—von der Decken et al filed Aug. 16, 1978, now abandoned, which in turn was a a continuation-in-part of co-pending application Ser. No. 732,455—von der Decken, et al filed Oct. 14, 1976 (now abandoned) which is a straight continuation of parent application Ser. No. 471,967—von der Decken, et al filed May 21, 1974 (now abandoned).

The present invention relates to a method of controlling the reactivities of a gas cooled core reactor, the core of which consists of poured fuel balls of the same diameter which are withdrawn in downward direction from the heap and if desired depending on the extent to which the heap of fuel balls has burned off, are again added from above.

It is customary for purposes of controlling core reactors with a heap of poured fuel balls to utilize absorber bars which are arranged either in the reflector or which are introduced directly into the heap. The last mentioned method is described for instance in German Pat. No. 12 63 939 and in German Auslegeschrift No. 2 136 403. For operating these absorber bars, special driving systems are required which must assure a precise insertion, an optimum braking and a safe withdrawal of the bars, keeping in mind that the fuel balls as well as the container wall surrounding the reactor core are in view of the absorber bars exposed to mechanical loads.

Starting from the state of the art as set forth above, it is an object of the present invention to provide a new method for turning off ball pile reactors which may be utilized for all control problems occurring in connection with the operation of a core reactor.

Figure 2:
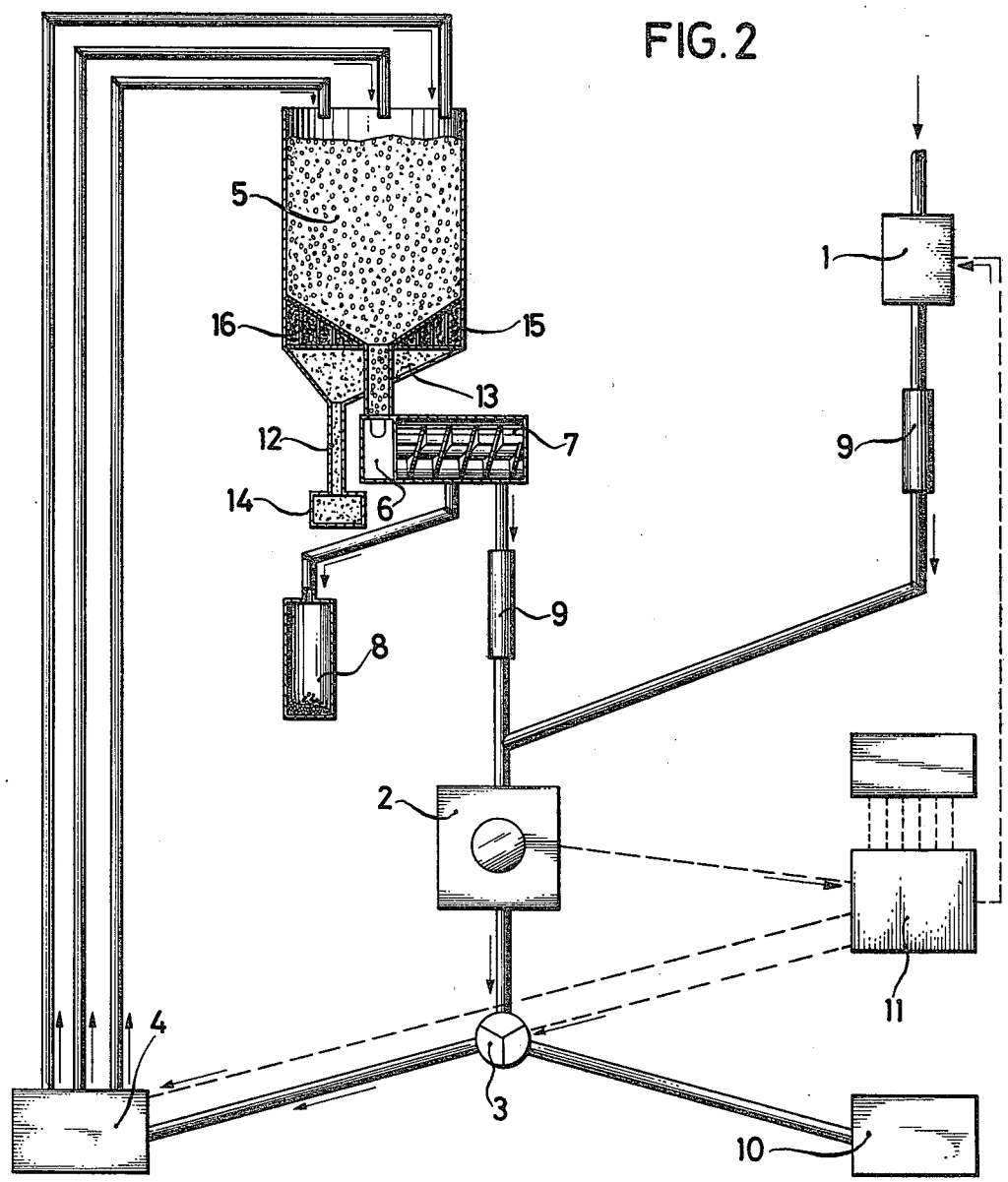

This object and other objects and advantages of the invention will appear more clearly from the following specification in connection with the accompanying drawings, in which:

FIG. 1 diagrammatically shows a reactor for carrying out one method according to the invention and FIG. 2 diagrammatically shows a reactor for carrying out another method according to the invention.

The method according to the present invention is characterized primarily in that balls consisting of absorbing material are brought into the pile with a smaller diameter than the diameter of the fuel balls while the diameter of the balls of absorbing material is expressed by the formula $d_A d_Z \leq d_A \leq d_Z + x d_Z$, preferably $d_Z < d_A < d_Z + x d_Z$, if $d_Z = D(2/\sqrt{3} - 1)$, and represents the diameter of the maximum possible ball which can be placed in the densest ball packing between three fuel balls contacting each other, and if $d_Z + x d_Z = D(\sqrt{2} - 1)$.

From French Pat. No. 80 481 a method has become known for carrying out core reactions in a breeder reactor the core of which consists of a loose pile of balls of fuel and breeder material of the same diameter and can be added in the shape of balls to the additional moderator form bodies, which are substantially smaller than the balls of fuel and breeder material. In addition to these form bodies of moderator material, also additional form bodies of absorbing material may be poured into the core controlling or turning off the reactor which additional form bodies may likewise be of ball shape and may have the same diameter as the moderator form bodies. The size of the balls to be added is so selected that they can pass through the ball pile proper nearly in an unimpeded manner.

In this connection it is mentioned that their diameter must be smaller than 0.15 times the diameter of the balls of fuel and breeder material. However, experience has shown that while balls of this size show the desired effect and in view of their gravity penetrate the pile of balls, the balls, however, due to their small dimensions so to speak flow through the pile of balls without getting stuck, and then collect on the bottom of the reactor core. Therefore, the method according to the above mentioned French patent is applicable only for first turn-offs. In order to be able to control the reactivity of the core reactor not only briefly, it is, however, necessary that the absorbing balls will during the control period be held in a uniformly distributed way over the entire height of the reactor core for a certain time. The invention is based on the finding that the filling factor f of a pile of balls which in a statistic pile amounts to approximately 0.6 varies between the value of F approximately equaling 0.74 corresponding to the densest ball packing, and the value of f approximately equaling 0.52 which prevails in a cubic packing. The smallest hollow space between interengaging balls of each layer therefore varies as to its size between a maximum value in a cubic packing (ignoring possibly occurring bridge formation) and a minimum value in the densest packing. Thus, for instance, diameter $d_Z$ of the maximum possible ball which just fits between three balls contacting each other in the densest packing amounts approximately to 0.9 cm if the balls have a diameter of 6 cm. The value of $d_Z$ can be calculated in conformity with the diameter D of the fuel balls according to the formula $d_Z = D(2/\sqrt{3} - 1)$. The differently large hollow spaces are statistically distributed in the pile of balls, and it is therefore possible by a correct selection of the diameter of the absorbing balls to permit these absorbing balls statistically distributed to enter the pile of balls at various depths.

Thus, the diameter $d_A$ of the absorbing balls therefore must not be below a certain value in order to assure that the absorbing balls will get stuck at the points of the densest ball packing and at the places with a less packing density will roll through. The pile of balls thus acts like a screen which retains the balls at some places, namely at the places of the densest packing while permitting the balls to flow through at other places namely those with greater hollow spaces.

The upper limit for the diameter $d_A$ of the absorbing balls is determined by the expression $d_Z + x d_Z$ because from a certain size on, the absorbing balls will no longer enter a standing ball pile. Only by agitating or stirring of the piles of balls it is possible to cause the balls, the diameter of which is greater than $d_Z + x d_Z$ to enter the pile and to pass therethrough. The value of x in the expression $d_Z + x d_Z$ can be defined and calculated from the equation $d_Z + x d_Z = D(\sqrt{2} - 1)$. This upper diameter limit corresponds to the diameter of the maximum possible ball which can just pass through a cubic packing.

The following considerations are based on the fact that the mean fill factor of 0.6 does not change materially over the pile of balls. Actually, the density in the lower region is somewhat higher but may in connection with the present consideration be disregarded. As has been described above, per layer of the pile of balls (for instance every 6 cm), a portion of the absorber balls with a diameter according to the invention is retained in this layer. Of N inserted balls, $\Delta N$ balls are retained per layer. In toto, the quantity N of absorber balls decreases by the amount of ΔN. Therefore, only N−ΔN balls enter the next layer. Thus if the diameter $d_A$ is so selected that in the first half of the pile, half of the inserted balls are retained, it will be appreciated that in the second half of the pile, again under the given conditions, half of the entered balls will be retained. Therefore, only 25% of the poured in absorbing balls leave the reactor core. By correct selection of the diameter $d_A$ of the absorbing balls, it can thus be realized that in the upper half of the pile of balls which has more reactivity, also more absorbing balls will be retained. When selecting the diameter $d_A > d_Z + xd_Z$, in one extreme case 100% of the balls will be retained in the upper layers of the pile, whereas when selecting the ball diameter $d_A < d_Z$, in the other extreme case the absorbing balls will nearly unimpededly flow through the pile. These two extreme cases are excluded with the present invention.

The expert in this field will thus be able by selecting a suitable diameter for the absorber balls to determine their speed of passing through the pile. In addition thereto, also the distribution of the absorbing balls in the pile of balls can be controlled and thus the flow distribution of the neutrons.

An advantageous employment of the method according to the invention therefore consists in that by an aimed addition of absorbing balls of different diameter or also different numbers in certain zones of the reactor core different changes in reactivity are created in said zones. Thus, for instance absorbing balls of a specific diameter may be brought into the inner zone of the reactor core in order here to bring about changes in reactivity for certain operations which changes are accelerated relative to the marginal zone, or to realize a certain flow distribution of the neutrons.

The addition of absorber balls is effected through one or more openings in the ceiling reflector of the reactor whereas the withdrawal of the absorbing balls from the reactor core is effected by stirring or agitating the pile of the balls of fuel material. In this connection, the absorbing balls are moved through the reactor core on one hand at the agitating velocity and on the other hand at an additional flow velocity in such a way that they will already after a short time period again drop out of the pile of balls. The additional flow velocity is due to the fact that during the agitating operation the balls of fuel material are rearranged so that the balls in their densest packing will be in a less dense packing and vice versa.

For further transporting of the absorbing balls there exist two possibilities namely either the absorbing balls are together with the balls of fuel material passed through the ball withdrawal pipe and move into a scrap separating device adjacent to said ball withdrawal pipe. In this device they are separated from the balls of the fuel material and are collected either in the scrap collecting container or in specific containers.

The second possibility of removing the absorbing balls from the reactor core consists in that the absorbing balls are withdrawn through slots provided in the reactor bottom for the passage of cooling gas, for which purpose these slots are designed correspondingly. The absorbing balls are thus already here separated from the balls of fuel material. The absorbing balls pass into the cooling gas supply chamber the bottom of which is provided with an opening and a corresponding drop so that the absorbing balls can be conveyed into the collecting container. Separate mechanical devices for withdrawing the absorbing balls from the pile are not necessary.

The method according to the invention may also be used in connection with other control and shut-off devices. Thus, for instance, for cooling the core reactor, absorbing rods may be used while the absorbing balls are taken advantage of for turning off the core reactor.

EXAMPLE

The invention will now be further explained in connection with a definite numerical example:

If the fuel balls which form the reactor pile have a diameter D of 6 cm, it will be appreciated that in the densest ball packing, between three fuel balls contacting each other, one ball with a diameter of approximately 0.9 cm can just be placed between said three interengaging fuel balls. The precise value of $d_Z$ is calculated in conformity with the formula $d_Z = D(2/\sqrt{3} - 1)$. For $D = 6$ cm, thus $d_Z = 0.93$ cm. In order to retain the absorbing balls at these places in the pile, they must have a diameter of $d_A$ which is not less than 0.93 cm (due to their friction, the absorbing balls will even if the diameters are equal, at least temporarily be retained in the densest packing). However, the diameter of said absorbing balls must not be greater than $d_Z + xd_Z$. Inasmuch as $d_Z + xd_Z = D(\sqrt{2} - 1)$, the value for x will be about 1.71, and the upper limit for the diameter will be approximately 2.5 cm. This diameter range represents a preferred value range for the absorbing balls because the absorbing balls will with a diameter within said range according to the invention partially pass through the pile of balls and partially will be retained therein.

Referring now to the drawings in detail and the method according to FIG. 1 in particular, the ball shaped fuel elements are conveyed by means of the feeding device 1, the measuring device 2 and the pneumatic lifting device 4 into the reactor 5. The absorbing balls may by means of a similar device which of course does not require a measuring device 2 conveyed into the reactor 5. By means of the separator 7 which separates the fuel elements with damaged surface or with a diameter below a minimum diameter, the undamaged fuel elements are conveyed to the measuring device 2 and subsequently are either as waste conveyed into the container 10 or are again by means of the lifting conveyor 4 introduced into the reactor 5. The movement of the fuel elements from the reactor 5 via the separator 7, the measuring device 2 and the conveyor 4 is designated as circulation of the fuel balls. Inasmuch as the absorbing balls have a considerably shorter diameter than the fuel element balls, they are so to speak sifted in the separator and dropped into the container 8.

According to the method to be carried out in conformity with FIG. 2, below the bottom of the reactor 5 there are arranged a separate collecting device 12 with funnel 13 and receiving container means 14. The bottom 15 of the reactor is as customary provided with slots 16 for guiding the cooling gas. The bottom 15 composed primarily of graphite blocks arranged one adjacent to the other.

With regard to the remaining parts shown in FIGS. 1 and 2, 1 diagrammatically indicates a ball feeding device, 2 indicates a differentiating device and a measuring device for measuring the extent to which the material has burned off. The numeral 3 represents a switch. The numberal 9 represents a buffer section and 11 represents a process calculator.

The present invention pertains to a method for control or regulation of the reactivity of nuclear reactors which are known by a designation ball pile reactor means. With such a nuclear reactor the fuel elements are provided within the reactor core as a ball dumping. The fuel elements become supplied to the nuclear or reactor core from above and pass through the reactor core and become withdrawn therefrom in a lower range or area. The ball dumping becomes subjected directly to cooling gas flow passing therethrough whereby each individual ball element on the outer surface thereof becomes subjected to flow circulating thereabout from the cooling gas flow. These features of the ball pile reactor include that the fuel element balls provide approximately equal ball diameter.

The previously known control or regulation of ball pile reactors with the aid of absorption bars or rods involves what is disadvantageous, however, in that the introduction and withdrawal of the absorption rods into the ball dumping sets not only a high requirement as to the drive system to be set up, but rather that also the fuel material balls become highly loaded mechanically as a consequence of the introduction of the absorption rods directly into the ball dumping.

For solution of this object there is inventively provided for regulation and control of the reactor core necessary absorption material added in the form of balls as to the ball dumping of the fuel elements in the reactor core and these additional balls can penetrate into the ball dumping between the fuel element balls. According to the teaching of the present invention there are set forth predetermined areas of measurement of the balls of absorption material dependent upon the measurements of the fuel elements of the ball pile reactor. The symbols provided in the original method includes particularly the symbols D, $d_A$, and $d_Z$ represent the following:

D = diameter of the fuel element balls
$d_A$ = diameter of the balls of absorption material
$d_Z = D(\sqrt{2/3} - 1)$ = diameter of those balls of absorption material which can be accommodated as the largest possible in the tightest ball packing at a time between three fuel element balls in engagement with each other. The value of the diameter $d_Z$ sets forth according to the inventive teaching the lower limit or boundary value for the embodiment of balls of absorption material.
$d_Z + x \ d_Z \ D(\sqrt{2} - 1)$ = value for the diameter of the largest ball of absorption material.

These definitions for the diameter of fuel element balls and balls of absorption material can be found also in the formula correctly stated as follows:

$$d_Z \leq d_a \leq d_Z + x d_Z$$

For control and regulation of the nuclear reactor the balls of absorption material with a diameter $d_A$ become added to the ball dumping from above. How and in which manner these balls of absorption material become introduced into the reactor core of the ball pile reactor can be found to be described clearly in the description for the present invention. The absorption balls penetrate on and on by themselves or automatically into the ball dumping. From the ball dumping the balls of absorption materials together with the fuel elements departing from the reactor core become removed again. Special devices for sliding or gliding of the absorption balls are not necessary within the ball dumping since by way of the movement of the fuel elements during passage through the reactor core there are intermediate chambers or spaces always becoming open which are passable for the absorption balls, and the description there is set forth that the absorption balls carried out of the reactor core with the fuel element balls are separable in a simple manner in a separator as a consequence of the ball diameter thereof being smaller in comparison to the diameter of the fuel element balls.

The addition of balls of absorption material into the reactor core or the removal thereof from the ball dumping is capable of being resolved by the average man skilled in the art with measures known by him from the state of the art. The concern involves measures representing an especially advantageous embodiment of the inventive method.

A complete teaching is provided for technical action for every average man skilled in the art in the present field of endeavor. According to claim 3 there becomes recited the teaching of not adding the balls of absorption material over the entire cross section of the reactor core but rather only in preselected zones. It is known to every average man skilled in the art that for the different types of control and regulation problems with ball pile reactors there come into question very different zones of the reactor core for addition of absorption material. The average man skilled in the art is entirely in a position to determine the zone or zones into which the absorption material prepared by him must be introduced at a time for the technical problem at hand or involved therewith. An example for one situation for regulation or control of the reactor core is provided in this specification. Naturally, there is possible for the average man skilled in the art in application of the inventive teaching for technical action to determine the necessary quantity of absorption material and the necessary diameter of the absorption balls for the prescribed technical problem. No concrete listing which would pertain to the special zones and a special number of absorption balls would seam to be necessary.

The reactor core of U.S. Pat. No. 3,464,888—Boettcher issued Sept. 2, 1969 has disclosure concerning introduction of layered fuel material particles into the reactor core in a helium atmosphere within shafts of graphite whereby the helium, however, does not become used as a cooling means but rather only serves for heat conduction (compare column 1, lines 17-33 and column 3, lines 36-48 of U.S. Pat. No. 3,464,888—Boettcher). Absolutely no mention is made with respect to the reactor disclosed by Boettcher as to a ball dumping in a reactor core becoming subjected to cooling gas flow directly therethrough. The cooling gas flow for the reference flows much more externally of the graphite shafts for instance, in passages 35 (FIG. 2). Also the concern with the fuel material particles of Boettcher does not involve fuel material particles of equal diameter as preconditioned for the fuel element balls with the teaching of the present invention. There is more important the fluctuation or variations of diameter of fuel element particles exist between 0.2 through 2 mm, preferably between 0.3 and 0.7 as apparent from column 5, lines 12-15 of U.S. Pat. No. 3,464,888—Boettcher. Such a fluctuation or variation of span or width for the fuel element balls of a ball pile reactor cannot be found to be provided or intended. The diameter of fuel element balls for pile reactor amounts to approximately 6 cm.

There may be known from U.S. Pat. No. 3,464,888—Boettcher to admix carbon material particles as moderator particles with respect to fuel material particles existing in a helium atmosphere. Yet there is apparent from column 4, lines 4 etc. that with the reactor type known from the disclosure of Boettcher that there cannot be either provided or even attainable the object of the present invention, namely to make possible a penetration of balls of absorption material into a quasi-stationary ball dumping. The mixing mentioned by Boettcher between the fuel material particles occur much more in common in passing through the reactor core without demixing which must be considered to be directly opposite to the inventive teaching for technical handling.

In view of the inventive teaching there is noted that U.S. Pat. No. 3,398,051—Seltorp issued Aug. 20, 1968 does not go beyond the state of the art known from U.S. Pat. No. 3,464,888—Boettcher. First the concern with the reactor of the primary reference does not involve a ball pile reactor. In the reference there becomes described much more a reactor with which the fuel elements float or swim in a melt. Column 4, lines 27 etc. there becomes suggested to introduce neutron absorbing particles into the melt. However, there can be ascertained from the description with respect to FIG. 7, column 4, lines 54–63 in connection with the remaining description of the primary reference a known reactor type especially from column 3, lines 59 etc. that the neutron absorption particles have a much smaller measurement than the fuel element bodies floating or swimming in the melt. Particularly this does not correspond to the measurements as provided for the balls of absorption material in accordance with the present invention. Accordingly an attempted combining of the features of the U.S. Pat. No. 3,398,051 with the features of Boettcher cannot lead to the teaching of the present invention.

Also the reactor described by U.S. Pat. No. 2,809,931—Daniels considered still to be at least pertinent to the embodiment of the reactor core of the inventive teaching there is stressed, however, that this reference cannot stand in the way of granting of patent for the features of the present invention. With the reactor, the regulation and control of the reactivity becomes undertaken in a conventional manner by way of insertion of absorption rods or bars which are guided in passages that penetrate the ball dumping (compare column 3, lines 13—23 of Daniels). Also in U.S. Pat. No. 3,039,945—Slack, et al, there cannot be found any showing or suggestion as to the features of the present invention. With the reactor described in Slack, et al, the concern involves much more a flow-bed reactor with which the fuel-material particles continuously become subjected to a through-whirl or turbulence by way of a gas flow introduced at the bottom of the reactor core. The measurements of absorption particles which should penetrate through the whirl layer accordingly must be selected in accordance with requirements which diverge entirely from the inventive teaching. No showing or suggestion for the inventive teaching for technical action can be found for the average man skilled in the art from the disclosure of U.S. Pat. No. 3,039,945—Slack, et al.

The Boettcher reactor is not comparable in any way with a ball-pile reactor of the present invention, at least so far as the reactor features are concerned. Attention is directed to the fact that the core fuel particles guided within a "filler gas" atmosphere in fuel passages with the Boettcher reactor would not have cooling gas flowing directly thereabout in contrast to the ball-pile reactor. Also, the graphite filling material mixed with the core or nuclear fuel particles would not be effective as neutron absorbing material, in any event, not so far as the desired absorption effect being concerned therewith as known to the average man skilled in the art in the field of reactor construction. There is naturally self-understood that neutrons become absorbed by every material. However, the average man skilled in the art in the field of reactor construction generally has an understanding with respect to neutron absorbing materials, for instance, iron, nickel, manganese, hafnium, boron, gadolinium and other materials are understood which provide an effective cross section of 2 Barn and above with a neutron energy of approximately 0.253 eV. The graphite filling material of Boettcher should result in homogenizing the neutron flow and should accordingly provide an absorption cross section for neutrons as low as or as small as possible (compare U.S. Pat. No. 3,464,888—Boettcher, column 3, lines 64, etc.). A replacement of this graphite filling material by way of the "strong neutron absorbing material" of U.S. Pat. No. 3,398,051—Seltorp I is accordingly entirely undesired and does not lead to any releasable reactor type.

A replacement of the graphite filling material by way of absorber material is, however, not at all the goal of the present invention. Much more there becomes sought to influence the reactivity of the ball pile reactor thereby that in the intermediate space existing between the fuel element balls lying upon each other there occurs passage and flow of cooling gas within a ball pile reactor additionally becoming filled with absorber material which becomes added to the ball pile from above and which penetrates the ball pile. The present invention contributes recognition that in order to attain a sufficient effectiveness there is necessary to limit the size of the added absorber material to a predetermined kernel size range.

The inventive teaching of the present disclosure does not become obvious either by way of the U.S. Pat. No. 3,464,888—Boettcher alone nor by way of any attempted combining of the Boettcher patent with the U.S. Pat. No. 3,398,051—Seltorp I. The measurements which are set forth in the U.S. Pat. No. 3,464,888—Boettcher for the range of particle size of graphite filling material are in no way relevant for the present inventive teaching since as already indicated, the present invention would not be concerned with the size of these particles, but rather with the size of the available intermediate space between the nuclear fuel material particles and filling material when according to the present invention for influencing the reactivity of the reactor. Additionally, there should be introduced or filled therein absorber material. How large the absorbing particles in this case are to be selected cannot be ascertained in any way from the Boettcher patent primarily because both for the nuclear fuel material particles and also for the graphite filling material wide ranges are set forth within which the diameter of the individual particles can fluctuate in contrast to a ball pile reactor in which the diameter of the fuel elements can diverge only negligibly or unessentially from each other.

The inventive teaching is not based upon readily obvious thinking for the average man skilled in the art. Once the inventive teaching is known there is readily possible to determine within the scope of the wording of the range recited for the kernel size of the absorber material at a time the necessary diameter of the absorber balls for the application or situation at hand.

There is emphasized that the fuel elements with the ball pile reactor have cooling gas flowing directly thereabout, and that the absorber material according to the present invention penetrates the ball pile in the intermediate space between the ball-formed fuel elements as introduced herein.

With understandable evaluation of the present invention, there must be proceeded much more on the basis that the crux of the invention is not met or anticipated or made obvious by any of the prior art. As apparent from the present U.S. specification, the goal of the present invention is to provide a method for turning off gas-cooled ball-pile reactor under a precondition that the ball-pile reactor provides fuel elements with approximately equal diameter. The goal of the present invention is clarified in claim wording reciting turning off, rather than controlling the reactivity.

During turning off of nuclear reactors, the concern is particularly that the absorber elements provided for this purpose penetrate into the reactor core.

The present invention first provides a suitable turning off method adapted for gas-cooled ball-pile reactors and which is effective without introduction or moving of the absorber rods into the reactor core. This is of great meaning especially for the operation of a reactor when because of a disturbance situation the absorber rods provided for turning off are no longer capable of being inserted. The inventive turning off method accordingly is suited especially as a fuel turning off system for a ball pile reactor.

The present invention utilizes gap volume existing between the fuel element balls lying upon each other in an advantageous manner for introduction of the absorber material in the fuel element ball pile. According to the present invention, a range or region is provided for measuring absorber balls to be introduced in a manner so that on the one hand there is made possible that the absorber balls do not pass or run through the ball pile unhindered as far as to the bottom of the reactor and on the other hand, however, also a sufficient penetration depth is provided for turning off the reactor with measurements set forth; absorber balls penetrate into the ball pile or dumping and are held back at this location. The absorber balls according to the present invention accordingly fulfilled two requirements that make possible a certain and safe turning off of the reactor; the absorber balls penetrate into the ball pile and remain statically distributed within the ball pile whereby the desired turning off of the reactor occurs.

Both of the aforementioned requirements are fulfilled, however, by the absorber balls only when the measurements thereof lie within the range set forth by the applicants. Upon exceeding the upper limit of the range, the absorber balls no longer fit or pass through the gaps of the ball pile and are held back on top upon the ball pile; when below the intermediate diameter range, the absorber balls donot remain in the ball pile, but rather drop unhindered through the ball pile or dumping. The inventive turning off method accordingly can be carried out exclusively only with such absorber balls of which the measurements fulfill the requirements set forth.

With the teaching of the present invention having as a goal to provide a quick effective turning-off system for the reactor, additionally, from the prior art, there is not provided any showing or suggestion that the absorber balls would provide a diameter diverging from the fuel element balls as provided in accordance with the present invention. Much more there is necessary to proceed on the basis that the absorber balls introduced into the burning-in phase of the reactor in the same manner as the moderator balls consisting of pure graphite provide the same diameter as the fuel elements themselves and passing or running in common with the fuel element balls through the reactor core. The separator 7 as ascertainable from the illustration serves only for separating of ball fractional pieces or fragments which arose during passage of the fuel elements through the reactor core 5. There is not ascertainable from any location of the prior art that in the separator it is possible to separate absorber balls also which provide a smaller diameter than the fuel element balls. There is necessary moreover to proceed much more on the basis that the moderator and absorber balls introduced into the reactor core in the burning-in phase first are separated in the burn-off measurement system.

When evaluating the disclosure of the prior art there cannot be proceeded in any manner on the basis that for the expert only still a dimensioning of the absorber balls would be required in order to obtain the features of the present invention. For turning-off of the nuclear reactor known from the prior art, control rods are installed in a conventional manner. The present invention cannot be derived from the prior art. Moreover, the present invention particularly is directed to the feature that the disadvantages provided hereby during turning off of the reactor are to be avoided in the manner as already set forth in the foregoing statements.

The "diluent balls" known from the prior art are not suitable in any way to penetrate through the fuel material passages filled with duel material particles. Moreover, with the prior art provision is made that the fuel material particles and "diluent balls" are added in common to the fuel material passages so that they also penetrate in common through the fuel material passages. Nothing is mentioned in the prior art concerning turning off by addition of "diluent balls" in such a manner that these penetrate through the filled fuel material passages independently of the fuel material particles. The "diluent balls" known from the prior art would not be suitable at all for this purpose, because of the measurements thereof. In order to attain the effect sought by the present invention, there would be necessary much more to separate the portion of the "diluent balls" known from the prior art, namely that portion which does not come within the range of size disclosed by the present invention. Such a selection of suitable particles, however, is preconditioned upon having knowledge of the teaching first given by the present invention for technical action to be taken. That only a portion of the "diluent balls" known from the prior art come within the range of size set forth, accordingly, is actually a criteria for the fact that the expert when also having knowledge of the measurements for the "diluent balls" of the prior art would not be placed into a position to carry out the present inventive method for turning off of ball-pile reactors on the basis of the reactor known from the prior art. The prior art shows the expert how to select the particles as small as possible so that these are uniformly distributed between the fuel elements with the cooling means as a carrier medium in the reactor core. This, however, is exactly opposite to the teaching of the present invention since as already set forth in the foregoing comments, the concern involves particularly to select the diameter for the absorber balls so that they do not pass or run through the ball pile, but rather remain in the ball pile. A distribution of the absorber particles with the gas-formed cooling means analogous to the manner of the method of reference B in accordance with the teaching of the present invention is not provided. With this known manner of proceeding for and also not being attained the desired turning off effect with gas cooled ball pile reactor with which the cooling gas continuously flows through the reactor core.

The crux of the present invention is much more the teaching to add particles consisting of absorber material supplied to the ball pile reactor with such particles having a selected size in relation to the fuel element balls. Under these circumstances, an essential precondition for the teaching of the present invention is that the fuel element balls existing in the reactor core are measured equal in size or magnitude. In the ball pile reactor, applicants have found that fuel element balls with uniform diameter of 6 cm are successful whereby divergence from this diameter is permissible in a range between 6.0 and 5.9 cm.

This concrete diameter value should not be considered to be an extensive limitation or restriction of the protection being sought. Even if previously the diameter of 6 cm for the fuel element balls is considered an optimum with ball pile reactors, the favorable recognition and granting of patent protection should not be limited to this measurement for fuel element balls of ball pile reactors. Under the foregoing conditions, wording should be considered together as to the concrete recitations about the absorber ball diameter.

Proceeding on the basis of a constant diameter of the fuel element balls, there is stressed that according to the present invention a range of ball size of the absorber material is prescribed which is so measured that the absorber balls can be given off to the ball pile and automatically penetrate into the ball pouring configuration in the event the ball pile reactor must be turned off. In order to achieve the foregoing, an exact recitation is required especially as to the smallest permissible diameter of the absorber balls as shown by extensive experiments.

The fuel element particles known from the prior art provides no uniform diameter. A value between 0.2 and 2 mm is set forth in the prior art for the size of the nuclear material particle diameter. For a comparison with the invention there is then, however, only considered the diameter of D=2 mm. This appears to be arbitrary and can be equated to an evaluation with the benefit of hindsight which is not justified for an objective evaluation and recognition of the invention. Moreover, the inventive contribution exists particularly therein, dependent upon diameter of the fuel element balls to set forth a ball size for the absorber particles, which distribute themselves in the ball pile of the fuel element balls in such a manner that a turning off of the ball pile reactor is attained.

The ball diameter of 6 centimeter for the fuel elements which are destined for ball-pile reactors results as the optimum value for the fuel element size taking into consideration temperature loading, heat tensions that arise, as well as economical thinking over of the situation; for this purpose, attention is directed to an article by W. Kersting entitled "Conceptual Study for a High Temperature Ball-Pile Reactor" appearing in a 1968 magazine "Nuclear Engineering and Design" on pages 345 etc., especially pages 351 and 352.

As a tolerance range for permissible divergence from ball diameter of 6 centimeters, there is valid the range between 5.9 cm to 6 cm for fuel elements for ball-pile reactors. This follows from the aforementioned reasons for optimizing the fuel element size especially the diameter of 6 centimeters cannot be permitted to be exceeded because of increasing fuel element inner temperature with increasing diameter (compare aforementioned 1968 magazine article of Kersting, page 352, FIG. 5).

Since the invention concerns the turning off of a ball-pile reactor, there must also be considered relevant for the present invention also only such fuel elements which are realizable in ball-pile reactors. An application of the invention with reactors which provide dumping material layers of fuel particles and/or breeding material particles with a diameter between 0.2 mm to 2.0 mm as disclosed by Boettscher (U.S. Pat. No. 3,464,888, column 2, lines 27–28) would not come into consideration. With such particle measurements, the measurement size for the absorber balls set forth in the patent claim would not be applicable for which it is preconditioned that the fuel element balls provide a ball diameter diverging only slightly from each other. Additionally, with such small particles there would be necessary so nominal sizes for the absorber balls given up for the dumping material layer according to the invention that because of the adhesion forces then becoming effective, there can no longer be realized that the absorber balls penetrate unhindered into the ball dumping and statically distributed themselves within the ball dumping which is necessary in order to turn off the ball pile reactor with certainty also in emergency. With the reactor of the prior art, there is not provided in any way a control of the reactor thereby that the dumping material layer has absorber particles given off thereto which penetrate into the dumping material layer. Moreover, the fuel particles and/or breeding material particles mixed with particles of pyrolytic coal material or graphite pass or wander through the reactor core described by the prior art.

It is, of course, to be understood that the present invention is, by no means, limited to the specific example set forth above, but also comprises any modifications within the scope of the appended claims.

We claim:

1. In a gas-cooled reactor of the pebble bed type:
   pebble bed nuclear fuel comprised of numerous uniform spherical fuel units, each having a diameter of approximately six centimeters;
   a container for containing the spherical fuel units in a three-dimensional pile, wherein the spherical fuel units define uniform spaces therebetween through which cooling gas circulates, the container having a ceiling reflector with opening means therethrough and a bottom having an opening means therethrough; and
   a plurality of neutron-absorbing spheres of absorbing material for arresting nuclear reactions in the pile when the absorbing spheres are poured through the opening means in the top of the container and accumulate in the spaces between the fuel units; the absorbing spheres having a diameter no less than 0.93 centimeters and no greater than 2.50 centimeters.

* * * * *

UNITED STATES PATENT AND TRADEMARK OFFICE
CERTIFICATE OF CORRECTION

PATENT NO. : 4,372,912
DATED : February 8, 1983
INVENTOR(S) : Claus-Benedict von der Decken et al It is certified that error appears in the above—identified patent and that said Letters Patent is hereby corrected as shown below:

On the title page, the following should be added:

(30) Foreign Application Priority Data:

May 22, 1973 (DE) Fed. Rep. of Germany... 2325828

Signed and Sealed this

Nineteenth Day of April 1983

[SEAL]

Attest:

GERALD J. MOSSINGHOFF

Attesting Officer

Commissioner of Patents and Trademarks